United States Patent
Kumar et al.

(10) Patent No.: US 6,646,761 B1
(45) Date of Patent: Nov. 11, 2003

(54) EFFICIENT UNDER COLOR REMOVAL

(75) Inventors: Santhosh T. N. Kumar, Kerala (IN); Venkat V. Easwar, Cupertino, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/392,211

(22) Filed: Sep. 8, 1999

(65) Prior Publication Data

(65) Related U.S. Application Data

(60) Provisional application No. 60/100,499, filed on Sep. 15, 1998.

(30) Foreign Application Priority Data

Aug. 12, 1998 (IN) ...................... 1814/MAS/98

(51) Int. Cl.[7] .............................. G06F 15/00; G03F 3/08
(52) U.S. Cl. ......................................... 358/1.9; 358/518
(58) Field of Search .................... 358/1.9, 515, 518, 358/1.1, 1.3, 3.22, 3.23, 1.16, 504, 520, 523, 530, 535, 538; 382/167, 162, 164, 165

(56) References Cited

U.S. PATENT DOCUMENTS

| | | | | |
|---|---|---|---|---|
| 4,779,029 A | * | 10/1988 | Henderson et al. | 315/367 |
| 4,953,013 A | * | 8/1990 | Tsuji et al. | 358/75 |
| 4,987,484 A | * | 1/1991 | Ikeda et al. | 358/75 |
| 5,032,904 A | * | 7/1991 | Murai et al. | 358/75 |
| 5,155,589 A | * | 10/1992 | Gere | 358/81 |
| 5,335,292 A | * | 8/1994 | Lovelady et al. | 382/17 |
| 5,881,210 A | * | 3/1999 | Guay et al. | 395/109 |
| 6,057,853 A | * | 5/2000 | Siegel et al. | 345/432 |
| 6,118,550 A | * | 9/2000 | Hayashi | 358/296 |
| 6,219,029 B1 | * | 4/2001 | Flakne et al. | 345/147 |
| 6,453,067 B1 | * | 9/2002 | Morgan et al. | 382/162 |
| 6,453,073 B2 | * | 9/2002 | Johnson | 382/239 |

* cited by examiner

Primary Examiner—Madeleine A V Nguyen
(74) Attorney, Agent, or Firm—Charles A. Brill; Wade James Brady, III; Frederick J. Telecky, Jr.

(57) ABSTRACT

A method of performing color space conversion and under color removal. Pixelated data is first resampled (102) to an efficient word size—typically 8-bits wide. The RGB color format data words are then subtracted from a maximum intensity to yield CMY color format data words. The minimum value of the three intensity words for each pixel is determined and used as an initial black value. A scaled version of the initial black value is then subtracted from each of the four CMYK intensity words (104). The resulting CMYK values are then limited to a range bounded by the maximum and minimum producible intensities for each color.

12 Claims, 1 Drawing Sheet

EFFICIENT UNDER COLOR REMOVAL

This application claims priority under 35 USC §119(e)(1) of provisional application Ser. No. 60/100,499 filed Sep. 15 1998.

FIELD OF THE INVENTION

This invention relates to the field of printer systems, more particularly to the printing of pixelated computer-generated text and images, still more particularly to the conversion of pixelated RGB-based image data into CMYK-based image data for printing.

BACKGROUND OF THE INVENTION

Printing technology is undergoing a revolution as the inexpensive computational power developed for the desktop computer market is applied to the printing industry. Paralleling this growth are the skyrocketing expectations of consumers. While just a few short years ago the goal was to find an acceptable replacement for typewritten text, now the demand is for photographic quality reproduction of both scanned images and computer-generated graphics. Meeting this demand required a significant increase in the resolution of the printed images—both spatial resolution and color depth—that demanded the application of massive amounts of processing power and memory.

Additional demands are placed on the processing power of a printer system by the need to convert images from the Red-Green-Blue (RGB) format used by virtually all CRT-based computer displays to the Cyan-Magenta-Yellow-Black (CMYK) format used by most print engines.

Furthermore, while image quality continues to increase, consumers continue to demand higher and higher print speeds from today's desktop printers. This expectation also leads to greater demands on the throughput of the print engine's processor. Thus, there is a need in the art for systems and methods to increase the efficiency and throughput of print engines.

SUMMARY OF THE INVENTION

Objects and advantages will be obvious, and will in part appear hereinafter and will be accomplished by the present invention which provides system and method for efficient under color removal. One embodiment of the claimed invention provides a method of performing color space conversion and under color removal comprising the steps of providing an intensity word for a first, second, and third color for each of four pixels, subtracting each intensity word for the first, second, and third colors from a maximum intensity word to obtain an initial intensity word for a first, second, and third complementary color, comparing the first, second, and third complementary color initial intensity words for each pixel to determine a minimum color intensity word for each pixel, setting an initial combined color intensity word equal to the minimum color intensity word for each pixel, determining an output intensity word for each of the three complementary colors, each of the output intensity words for said complementary colors equal to the initial complementary color intensity word minus a scaled value of the initial combined color intensity word, each of the output intensity words for the complementary colors limited to a range bounded by a minimum and maximum producible intensity, and determining an output intensity word for the combined color, the output intensity word for the combined color equal to the initial combined color intensity word minus a scaled value of the initial combined color intensity word, the output intensity word for the combined color limited to a range bounded by a minimum and maximum producible intensity.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

In order to maximize the performance of a print engine, it is critically important to optimize the core functions that are done repetitively for each pixel printed. A typical print engine is capable of printing simple text-based pages or pages combining many components, such as a background color, text having a specified font and location, and bit-mapped images. Regardless of the contents of each page, each pixel of the desired image typically is represented by multiple words of image data.

Image data is defined as a sequence of multiple-bit words representing an image. Each word represents the intensity information for one color and one pixel. For example, three image data words are used to represent a single pixel using the RGB color format—one word representing the intensity of the red primary color component, one word representing the intensity of the green primary color component, and one word representing the intensity of the blue primary color component. Likewise, four words are used to describe a single image pixel in the CMYK color format—one for cyan, one for magenta, one for yellow, and the fourth one for black.

Although the description of the disclosed invention will focus on only the RGB and CMYK color formats, it should be understood that other primary colors may be substituted for the disclosed primary colors with appropriate adjustments. The use of the RGB and CMYK primary color formats is for purposes of illustration, not limitation, since the RGB and CMYK color formats are by far the most common tri-stimulus primary colors used to create luminous images and printed documents.

Figure 1:
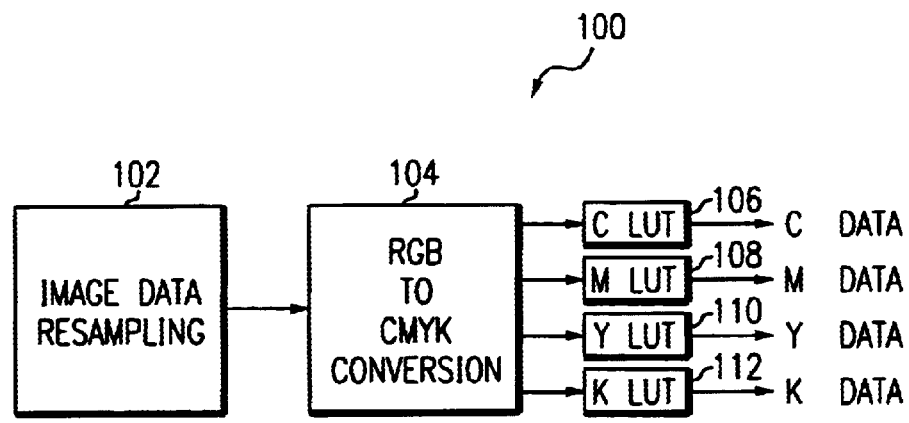
FIG. 1 is a block diagram of an efficient method and system for translating pixelated image data from an RGB-based CRT display system to a CMYK-based printer system.

FIG. 1 is a block diagram 100 of an efficient method and system for translating pixelated image data from an RGB-based CRT display system to a CMYK-based printer system. The block diagram of FIG. 1 includes an image data resampling block 102, an RGB to CMYK conversion block 104, and lookup tables 106, 108, 110, 112 for each of the four CMYK component colors.

The optional image data resampling block 102 receives image data an converts the word size of the image data to a word size that the RGB to CMYK conversion block 104 can efficiently process. For example, depending on the image source, image data is comprised of a series of 1, 2, 4, 8, or 12-bit samples. Print engines may require an 8-bit data word. Additionally, video processors such as the TMS320C80 manufactured by Texas Instruments Inc. can process image data very efficiently in 8-bit words. Therefore, to provide commonality between the image processing hardware and the print engine, it is efficient to convert the 1, 2, 4, and 12-bit input words into 8-bit data words.

According to one embodiment of the disclosed invention, the image data resampling block 102 is one or more lookup tables designed to convert a digital input having a first word size into a digital output having another word size. For example, a 2-bit input word having possible values of 00, 01, 10, and 11 is converted to an 8-bit output word corresponding to the magnitude of the input word—namely hexadecimal ^00, ^55, ^AA, or ^FF.

The image data resampling function is possible to perform in software or even using specialized dedicated circuitry. Using the lookup table method described above, however, saves two clock periods per pixel compared to the conventional software implementation—a significant savings considering three image data words must be converted for each pixel of image data.

Once the image data is converted to a word size that the processor may efficiently process, the image data is converted from RGB color format, which is convenient for CRT-based computer displays, to CMYK color format, which is efficient for printer systems. Color conversion is a two-step process. The first step consists of generating an intensity word for each of the three primary colors in the CMYK format. The second step is the generation of a black component and the alteration of the three primary colors to compensate for the added black component and to produce a better approximation of the original color.

Since the RGB and CMY color formats are comprised of complementary primary colors, converting between the two color formats merely requires subtracting the intensity value for each primary color from a maximum intensity value. This relationship is represented by the following equations where each letter represents the intensity of that primary color in the RGB or CMYK color formats:

$C=1.0-R$ $M=1.0-G$ $Y=1.0-B$

Figure 2:
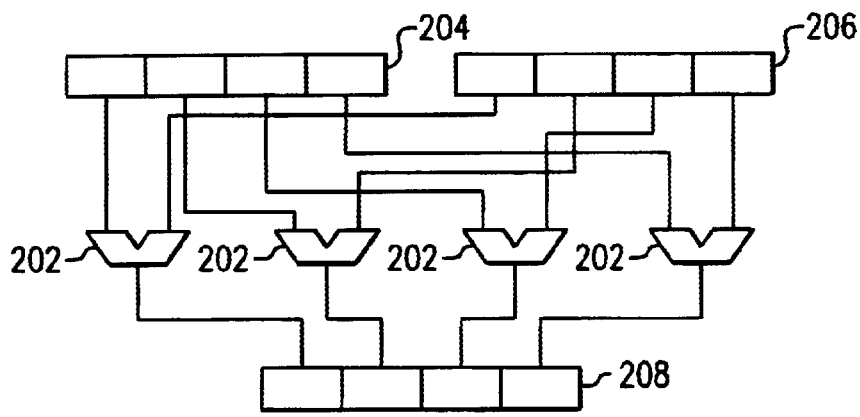
FIG. 2 is a schematic diagram of four parallel processors performing a byte-wise comparison of two 32-bit input words.

This color conversion step is efficiently performed four pixels at a time by using the multiple video processors of a TMS320C80 digital signal processor or equivalent. FIG. 2 is simlified schematic diagram of the multiple video processor (MVP) of the TMS320C80 manufactured by Texas Instruments Incorporated. Each of the arithmetic logic units 202 (ALU) of FIG. 2 is capable of executing the same instruction on a separate byte of data. The ALUs 202 also work together to execute some instructions using 32-bit doublewords (dwords) of data from the input source registers 204, 206. When operated independently, the four ALUs process single color pixel information for four pixels simultaneously. Thus, in one processor clock period, four pixels of red data are converted to four pixels of cyan data.

After the input image data is converted to CMY color data, the print engine determines the amount of black represented by the three primary color data words for each image pixel. Although pixels formed using only the three primary color data words have the correct image color, it is more efficient to use a black component than to rely on an equal combination of the three color components to create black.

Since equal amounts of the three primary colors combine to form black, the magnitude of the black ink component is theoretically equal to the minimum of the three primary color words representing each image pixel. Ideally, an amount equal to the entire black component is subtracted from each of the three primary colors—in effect completely transferring the black component from the CMY data words to a separate K data word. There is not, however, a one-to-one correlation between the minimum primary value and the value subtracted from the primary colors.

The minimum color intensity word, that is the initial black value, is determined for four pixels in only two byte-wise comparisons using the MVP. A dword comprised of intensity data for a first color for four pixels is compared to a dword comprised of intensity data for a second color for the same four pixels. The byte-by-byte minimums from this comparison are then compared to a dword comprised of intensity data for a third color for the same four pixels. The four bytes resulting from the second comparison are the minimum color intensity words for each of the four pixels.

For example, cyan image data for four pixels ($C_1$, $C_2$, $C_3$, $C_4$) is loaded in a first input register 204 and magenta image data for four pixels ($M_1$, $M_2$, $M_3$, $M_4$) is loaded in a second input register 206. The two dwords are compared on a byte-by-byte basis by the four ALUs 202 and the minimum of the two values forms a dword output 208. The dword output 208 represents the minimums of the two colors, in this example the cyan data for pixels 1 and 4 and the magenta data for pixels 2 and 3 ($C_1$, $M_2$, $M_3$, $C_4$). This intermediate value ($C_1$, $M_2$, $M_3$, $C_4$) is then compared to the yellow image data for the four pixels. The byte-by-byte minimums from this second comparison ($C_1$, $M_2$, $M_3$, $Y_4$) represent the minimum of the three primary colors for each of the four pixels and are the black (K) image data words for each of the four pixels. In this example, only the yellow data for the fourth pixel is less than the minimums from the first comparison. Therefore, the black image data for the four pixels is $C_1$, $M_2$, $M_3$, and $Y_4$.

Although shown as separate input and output registers in FIG. 2, the registers are implemented in multiple ways. For example, the input and output registers may be part of a dedicated register file accessible by the ALUs. Alternately, the input and output registers shown in FIG. 2 are locations in a memory array.

In practice, it is advantageous to scale the combined color component, or black component, as well as the amount of the combined color component subtracted from the three primary color words in order to improve image quality. Scaling the combined color component results in part of the black image component being formed by black ink and part formed by a combination of the three primary colors. The scale factor used may range from −1 to +1 times full-scale, or −255 to +255 for an eight-bit number.

The combined color value is typically scaled using a memory lookup table. The scaling, which is sometime referred to as gamma correction, adjusts the combined color value to compensate for the non-linear properties of the printer. The scaling optionally performs a screening operation. For example, the scaling can limit the maximum value of the combined color value in order to perform threshold screening. To make the process more efficient, all of these functions—black generation, non-linear compensation, and screening—are combined into a single lookup table.

The initial black value, or initial combined color intensity word, is equal to the minimum of the three color intensity words for a given pixel, and is used as an index into the memory lookup table. The value stored at the location pointed to by the index is used for the actual black value, or the output intensity word for the combined color. The values stored in the black generation lookup table range from zero to the maximum allowable black level. Therefore, the black generation lookup table performs the function:

black=min(1.0, max(0.0, $BG(k)$))

where BG(k) is the combined lookup table for both the black generation and the transfer function, k is the initial black value, and black is the actual black value—the output intensity word for the combined color.

The actual output intensity word for each of the three primary colors, or each of the three complementary colors when color conversion and under color removal are combined, is determined by the following equations:

cyan=min(1.0, max(0.0, $C-UCR(k)$))

magenta=min(1.0, max(0.0, $M-UCR(k)$))

yellow=min(1.0, max(0.0, $Y-UCR(k)$))

where UCR( ) is the under color removal transfer function, k is the initial black value—that is the initial combined color intensity word—and C, M, and Y are the initial intensity words for each of the three complementary colors.

As shown above, the initial black value is also used to index an under color removal lookup table to determine how much each color is reduced to compensate for the addition of the black ink. Each color uses the same UCR lookup table. Each color, however, may have a unique transfer function lookup table 106, 108, 110, as shown in FIG. 1.

The UCR lookup tables for the primary colors are typically 2-bytes-wide in order to provide sufficient precision while allowing the scaled values to range from −255 to +255. Since two bytes are used to store the UCR values, but only nine bits are required for the −255 to +255 range, the upper byte will be "0000 0000" for positive numbers and "1111 1111" for all negative numbers.

The scaled value of the black component generated by the UCR lookup table is subtracted from the initial value for each color in order to obtain the output intensity word for each color. The output intensity word for each color is limited to values between 0.0 (no color component contribution) and 1.0 (maximum color component contribution). As discussed above, it is advantageous to minimize the processing required to perform the scaling, subtraction, and output clipping.

One method of minimizing the processing necessary to perform the scaling, subtraction, and output clipping takes advantage of the 2's complement format in which the data in the UCR lookup table is stored, and the multiple ALUs available in modern signal processors such as the MVP. Using the MVP allows under color removal, as well as clipping the data to a maximum value of 1.0 or clamping the data to a minimum value of 0.0, if necessary, to be performed on four pixels of single-color data in only two processor clocks.

As mentioned above, the UCR tables are comprised of two bytes for each possible index value. Since color data is limited to 8-bits (0 to 255), the data in the UCR table is limited to −255 to +255—a range which only requires 9-bits of data. The most significant byte is the sign byte and contains all zeros in the case of a positive number and all ones in the case of a negative number. The sign byte is not used during the actual subtraction of the scaled black value from the initial color intensity word. This subtraction is performed as unsigned subtraction in which the subtrahend is complemented and added to the minuend along with an injected carry into the LSB. Sample code for the MVP is:

$C\_reg=mc\ C\_reg-UCRreg$ where C_reg contains a byte of intensity data for each of four pixels, and UCRreg contains the magnitude byte of data for four pixels. The "mc" modifier specifies byte-wise operation and sets the carry flags if necessary.

Code for reading the black generation (BG) and under color removal tables (UCR) is listed below:

```
;*** START OF CODE ******************************
;***********************************************
;
; BG and UCR LUT readings are done here. BG(k) returns
; the output K. UCR(k) can be positive or negative
; UCR is stored in 16 bit 2's complement form. Here the
; sign (first 8 bits) and the magnitude (lsb 8 bits)
; of UCR are separated and stored at different locations
; for faster future usage. Please note that previous
; loops have given the minimum value of c, m, & y and is
; store in Ga_out_mink location. Each time one byte
; is loaded for processing here.
;***********************************************
BG_UCR_LOOPSTART:
        tempreg0 =ub UCR >> 8
     || Lx_k1 =ub *(Ga_outmink++)    ; load k1
     || *(La_outK++)=uh BG2   ;this is the final BG output as BG(k)
                                       ; store the final value of K as BG is
                                       ; planned to incorporated transfer fh
                                       ; also
        signpacked =uh UCR1 & ~%8 + tempreg0
     || Gx_k2 =ub *(Ga_outmink++)    ; load k2
        BG1 =ub * (La_BGLUT + Lx_k1)   ; BG LUT1
     || *(Ga_outUCRsign++) =uh signpacked
        UCRpacked =uh UCR1 \\ 8 | UCR2 & %8
     || BG2 =ub * (Ga_BGLUT + Gx_k2)
     || UCR1 =uh *(La_UCRLUT + [Lx_k1])
le0_BG_UCR_LOOPEND:
        BG2 =uh BG2 + BG1 << 8
```

-continued

```
||  UCR2 =uh * (Ga_UCRLUT + [Gx_k2])
||  *(La_outUCR++) =uh UCRpacked
;*** END OF CODE ******************************
```

After the subtraction, the data is clipped and clamped by a logical operation using the intermediate results in the color register, C_reg, the byte-wide sign information from the UCR table, and the carry flag which is expanded to 8-bits for each of the four ALUs. Sample code for the MVP is:

C_reg=(C_reg |(UCRsign & @mf))&(UCRsign |@mf)

where UCRsign is a byte of sign information for four pixels of data which is "1111 1111" when the subtrahend is a negative number, and @mf is the carry out flag expanded to eight-bits. The result of this logical operation is that each byte of the C_reg is clamped to "0000 0000" when the subtraction operation should otherwise return a negative number (subtract a positive number and no carry—UCRsign and @mf both equal "0000 0000"), clipped to "1111 1111" when the subtraction operation should otherwise return a positive number greater than 8 bits (UCRsign & @mf both equal "1111 1111"), and otherwise unaltered.

Sample MVP code for the subtraction, clip and clamp operation is:

value to be subtracted from a given primary color initial value word 308.

Arithmetic logic unit (ALU) 310 subtracts the scaled black value 306 from the primary color initial intensity word 308. The output of the ALU 310 is a byte of data 312 and a single carry-out bit that is internally expanded, or replicated, to a byte 314. The carry-out byte 314 is logically ANDed with the UCR lookup table sign byte 304 by AND gate 316. The output of gate 316, actually eight gates, is "1111 1111" when the data byte 312 is greater than 255—that is, when an overflow condition occurred in ALU 310. OR gate 318 replaces the output of the ALU with all ones to clip the output to 255 when there has been overflow.

The output of OR gate 318 is gated out by AND gate 320. When the subtrahend is negative or there is a carry-out condition, the output of gate 318 is gated out—which is the data output 312 from the ALU 310 unless there is both a carry-out and negative subtrahend, in which case all 1's are output. No carry-out with a positive subtrahend indicates a negative result which is clamped at "0000 0000" by AND gate 320.

```
;*** START OF CODE *******************************
;*********************************************************
; The sign and magnitude (even though it is 2's complemented)
; are stored at different locations. Depending on the sign and
; magnitude the numbers are added/subtracted to the UCR loop.
; please follow the M_reg flow which should explain the things in
; the loop. UCRreg is stored with 4 pixels of UCR data where
; as UCRsign contains the sign of these 4 pixels.
;*********************************************************
ADD_SUB_LOOPSTART:
        C_reg =mc C_reg - UCRreg
||      *La_Yptr++ = Y_reg
        C_reg = (C_reg | (UCRsign & @mf)) & (UCRsign | @mf)
||      M_reg = *La_Mptr
        Mreg =mc M_reg - UCRreg
||      *La_Cptr++ = C_reg
        M_reg = (M_reg | UCRsign & @mf)) & (UCRsign | @mf)
||      Y_reg = *La_Yptr
||      UCRreg = *Ga_UCRregptr++
        Y_reg =mc Y_reg - UCRreg
||      *La_Mptr++ = M_reg
||      UCRsign = *Ga_insignptr++
le0_ADD_SUB_LOOPEND:
        Y_reg = (Y_reg | (UCRsign & @mf)) & (UCRsign | @mf)
||      C_reg = *La_Cptr
;*** END OF CODE ********************************
```

Figure 3:
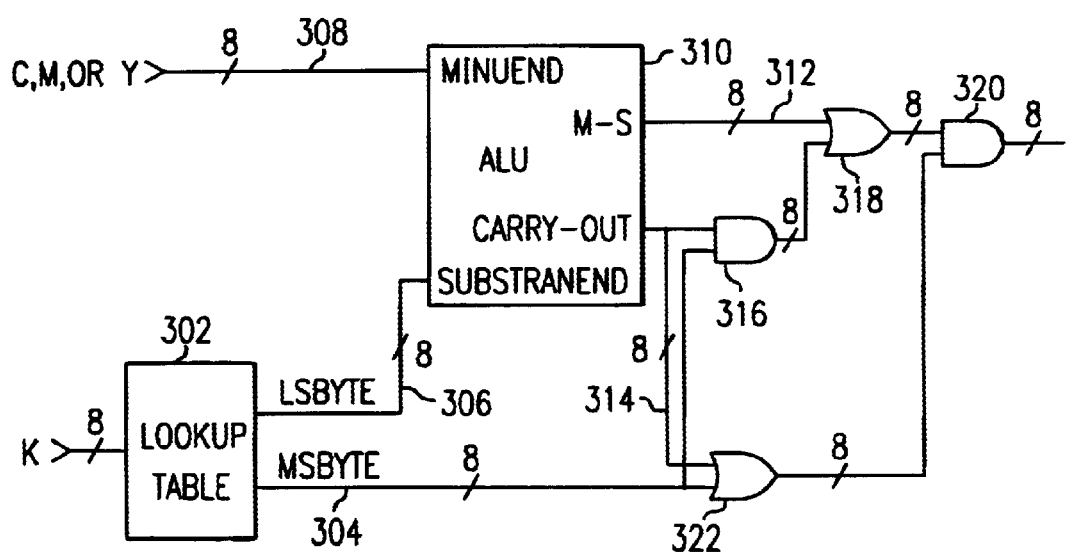
FIG. 3 is a schematic representation of one implementation of under color removal that minimizes the processing required to perform the scaling, subtraction, and output limiting functions.

FIG. 3 shows a schematic representation of one implementation of the under color removal described above that minimizes the processing required to perform the scaling, subtraction, and output limiting functions. FIG. 3 only shows the under color removal operation for a single color of a single pixel. As described above, the MVP performs the, operation for four pixels at a time.

In FIG. 3, the initial combined color word, or black value K, is used as an index into an under color removal lookup (UCR) table 302. The output of the UCR lookup table 302 for each value of black consists of a sign byte (MSB) 304 and a magnitude byte 306 representing the scaled black Thus, although there has been disclosed to this point a particular embodiment for efficient under color removal, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of performing color space conversion and under color removal, said method comprising the steps of:

providing an intensity word for each of a first, second, and third color for each of four pixels;

subtracting each said intensity word for each of said first, second, and third colors from a maximum intensity word to obtain a complementary color initial intensity word for each of said first, second, and third complementary colors for each of said four pixels;

setting a minimum color intensity word for each pixel equal to a minimum of said first, second, and third complementary color initial intensity words;

setting an initial combined color intensity word for each of said four pixels equal to said minimum color intensity word for each pixel;

generating an output intensity word for each of said first, second, and third complementary colors for each of said four pixels, each of said output intensity words for each of said first, second, and third complementary colors equal to said initial complementary color intensity word minus a scaled value of said initial combined color intensity word, each of said output intensity words for each of said first, second, and third complementary colors limited to a range bounded by a minimum and maximum producible intensity for each of said first, second, and third complementary colors; and generating an output intensity word for said combined color for each of said four pixels, said output intensity word for said combined color equal to a scaled value of said initial combined color intensity word and limited to a range bounded by a minimum and maximum producible intensity for said combined color.

2. The method of claim 1, said comparing step performed by the simultaneous pixel-wise comparison of two of said first, second, and third complementary color initial intensity words for four pixels, the result of the comparison then being compared to a third of said first, second, and third complementary color initial intensity words.

3. The method of claim 1, said step of generating an output intensity word for each of said three complementary colors involving the use of a lookup table to scale said initial combined color intensity words.

4. The method of claim 1, said step of generating an output intensity word for each of said three complementary colors comprising the steps of:

subtracting a common value from each of said initial intensity words for said first, second, and third complementary colors to yield an intermediate value, said common value based on said minimum color intensity word.

5. The method of claim 4, said step of generating an output intensity word for each of said three complementary colors further comprising the step of:

scaling said intermediate value.

6. The method of claim 4, said step of generating an output intensity word for each of said three complementary colors further comprising the step of:

scaling said intermediate value using a transfer function lookup table.

7. The method of claim 4, said step of generating an output intensity word for each of said three complementary colors further comprising the step of:

limiting said intermediate value to a positive value.

8. The method of claim 4, said step of generating an output intensity word for each of said three complementary colors further comprising the step of:

limiting said intermediate value to a value capable of being expressed by an unsigned n-bit binary word.

9. The method of claim 4, said subtracting step comprising the step of providing a minuend, said minuend represented in unsigned binary format by n bits;

providing a subtrahend, said subtrahend represented in 2's complement format by n+1 bits, wherein n bits comprise a magnitude portions and a most significant bit is a sign bit;

subtracting said subtrahend from the minuend to yield an n-bit result, wherein said subtraction has the effect of adding both the compliment of said magnitude portion and a one to the minuend;

logically ORing each bit of said result with the logical AND of said carry-out and said sign bit; and logically ANDing each bit from said logically ORing step with the logical OR of said carry-out bit and said sign bit to yield an output bit, wherein each output bit is a logical "0" when said minuend minus said subtrahend is a negative number, a logical "1" when said minuend minus said subtrahend is greater than $2^n-1$, and equal to a corresponding bit of said n-bit result when said minuend minus said subtrahend is a positive number less than $2^n-1$.

10. The method of claim 1, said step of generating an output intensity word for said combined color involving the use of a lookup table to scale said initial combined color intensity word.

11. The method of claim 1, said step of generating an output intensity word for said combined color involving the use of a single lookup table to scale said initial combined color intensity word, said lookup table incorporating a gamma function.

12. The method of claim 1, said step of generating an output intensity word for said combined color involving the use of a single lookup table to scale said initial combined color intensity word, said lookup table compensating for the non-linear response of a printer.

* * * * *